United States Patent [19]

Iwata

[11] Patent Number: 5,762,183

[45] Date of Patent: Jun. 9, 1998

[54] SWITCH DEVICE AND MANUFACTURING METHOD OF STATIONARY CONTACT BASE THEREOF

[75] Inventor: Keiji Iwata, Saitama, Japan

[73] Assignee: Toyodenso Kabushiki Kaisha, Tokyo, Japan

[21] Appl. No.: 749,545

[22] Filed: Nov. 15, 1996

[30] Foreign Application Priority Data

Nov. 17, 1995 [JP] Japan ................... 7-299870

[51] Int. Cl.$^6$ .................................................. H01H 19/20
[52] U.S. Cl. .................. 200/571; 200/570; 200/293; 200/564; 29/622
[58] Field of Search ................... 200/293, 252, 200/564, 570, 571, 336, 335, 325; 29/622

[56] References Cited

U.S. PATENT DOCUMENTS

| | | |
|---|---|---|
| 3,939,313 | 2/1976 | Hayashi et al. . |
| 5,023,414 | 6/1991 | Mihara et al. . |
| 5,571,999 | 11/1996 | Harris ................... 200/571 |
| 5,577,605 | 11/1996 | Dilly et al. ................... 200/570 |

FOREIGN PATENT DOCUMENTS

| | | |
|---|---|---|
| 6-5055 | 1/1994 | Japan . |
| 6-12586 | 3/1994 | Japan . |

OTHER PUBLICATIONS

Official English Language Translation of the International Preliminary Examination. Application No. PCT/EP95/01602, Dec. 2, 1996.

*Primary Examiner*—David J. Walczak
*Attorney, Agent, or Firm*—Birch, Stewart, Kolasch & Birch, LLP

[57] ABSTRACT

Shaft holes 12 and 22 are formed on each pivot portion of a switch case 10 having an unfolded fan shaped concave body 11. A stationary contact base 20 covers the concave body, and a corresponding end portion of a shaft holder 40 are fitted into the respective holes to rotate freely. In addition, positioning through-holes 18 and 27 are formed at each corresponding portion of the switch case 10 and the stationary contact base 20. Either the switch case 10 side or the stationary contact base side 20 is set on an assembly jig 80 toward these shaft holes 12 and 22 and the positioning holes 17 and 27. As a result, the lever 72 can be engaged from either side of the switch case 10 or the stationary contact base 20.

6 Claims, 9 Drawing Sheets

SWITCH DEVICE AND MANUFACTURING METHOD OF STATIONARY CONTACT BASE THEREOF

BACKGROUND OF THE INVENTION

1. Field of the invention

The present invention relates to a switch device such as a shift position switch and the like for an automobile.

2. Description of the Prior Art

In an example of such a switch for an automobile, there is an inhibitor switch (or a shift position switch) shown in Japanese Utility Model Publication H6-12586 (12586/1994). The switch comprises a switch case having a concave body approximately in the shape of an unfolded fan. A movable member is accommodated in the concave body to rotate freely thereabout and having some movable contacts therein. A circuit board is shaped like an approximately unfolded fan having stationary contacts screwed on the switch case to cover the concave body, wherein a rotary shaft is integrated at one end of the movable member. One end of the rotary shaft is protruded and fitted in a pivot hole of the switch case. An operating lever is connected to a protruding portion outward from the pivot hole. A shaft hole is formed on another end of the rotary shaft and a fulcrum projection projecting from the circuit board side is fitted hereinto. A positioning projection is integrated in another place of the circuit board. Three parts comprising the switch case, the movable member, and the circuit board are positioned by fitting the positioning projection with a through-hole arranged in the switch case.

Also, a terminal base for using such a switch is shown in Japanese Utility Model Laid Open H6-5055 (5055/1994). In the terminal base, an approximately unfolded fan shaped concave body is formed and stationary contacts are exposed herein. A manufacturing method of the terminal base is accomplished by the following process: first, a terminal plate having stationary contacts is insert molded together for a primary molding and then a pin hole for fixing the terminal plate formed on the primary molding is enclosed by a covering resin as a secondary molding.

In the Japanese Utility Model Publication H6-12586, since it is necessary that the rotary shaft of the movable member projects on the case side only, mounting of the lever is limited to the case side. Requiring that the lever mounting is changeable either on the case side or on the circuit board side according to a mounting place of the switch is impossible.

In the Japanese Utility Model Laid Open H6-5055, since the secondary molded portion does not cover all of the circumference of the primary molded body and is simply piled on it, the primary molded body is exposed. As a result of that, it is possible that a slit will form between the primary molded body and the secondary molded portion by a difference of thermal shrinkage rate of both members. Then, water may enter from the slit to the terminal plate inside of the primary molded body causing damage.

In producing such a switch, a common molding process of the terminal base exposes stationary contacts thereon. Beforehand, the stationary contacts are embossed on a part of the terminal plate, which is set in the molding die and insert molded by pouring insulation resin for covering the stationary contacts. Machining of the contact surface is required but the surface of the stationary contacts are injured by this machining.

SUMMARY OF THE INVENTION

In order to resolve the above problems, a switch device according to the present invention comprises: a switch case having a concave body approximately in the shape of an unfolded fan, a movable contact holder disposing a part thereof in the concave body so as to rotate freely; and the contact holder being accommodated with a shaft member to be a rotary center at one end thereof. A stationary contact base is mounted on the switch case so as to cover the concave body and disposing the movable contact holder therein. Stationary contacts are supported on the surface of the stationary contact base by exposing the inside of the concave body which permits the movable contacts projecting from one side of the movable contact holder to slidingly contact therewith. Shaft holes are formed on a part of the switch case to form a portion corresponding to a pivot of the unfolded fan and on a portion of the stationary contact base corresponding to the pivot portion respectively. Corresponding end portions among both ends of a shaft member formed in a shaft direction at one end of the movable contact holder are fitted rotatively in these shaft holes respectively. A through-hole for a lever mounting is formed on a shaft member of the movable contact holder in a shaft direction. Positioning holes are formed by passing through a corresponding portion of the switch case and the stationary contact base respectively.

According to the aforementioned, the switch case is assembled by placing the movable contact holder between the switch case and the stationary contact base, by means of the through-hole for the lever mounting, which is formed in the shaft member of the movable contact holder fitted in the respective shaft hole of the switch case. The stationary contact base is fitted on one positioning axis of the jig (which has two positioning axes) and both positioning holes of the switch case and the stationary contact base are fitted on the other positioning axis of the jig, and a distance between each center point of the shaft hole and the positioning hole can be calculated.

The through-hole for lever mounting and the positioning holes pass through both the switch case and the stationary contact base respectively. Therefore, when the switch device is assembled, it can be assembled by fitting the jig from either side of the switch case or the stationary contact base side turned up side down.

Moreover, lever mounting is also possible from either side of the switch case or the stationary contact base. It is also possible that the shaft hole and the positioning holes are formed on an outside of the switch case concave body respectively. In this situation, even if the shaft hole, the through-hole for lever mounting, and positioning holes, pass through the switch case and the stationary contact base, excellent water proof ability in the contact portion is maintained.

In addition, it is possible that the positioning holes are made in a shape of long hole lengthened in a radial direction of the movable contact holder rotation direction. In that case, the movable contact holder may be precisely positioned in the switch case. The position of the stationary contact base in the rotary direction is an important dimension in the assembly. In the radial direction of rotation dimensional precision is not required and therefore, it is possible to assemble the device absorbing some dimensional error.

Further, in the process for manufacturing of the stationary contact base used for the switch device, the process comprises the following steps: in an inner base a wiring strip having stationary contacts is inserted and is molded; after a window hole larger than a positioning hole of the stationary contact base is formed at a position corresponding to the positioning hole, the inner base is insert molded in a thickness dimension of the stationary contact base by embedding the inner base in the molding die of the stationary contact base and pouring the insulation resin into it an inner side of the window hole of the inner base is then covered with the insulation resin; and the positioning hole is formed by passing through a smaller hole than the window hole on the insulation layer formed inside the window hole.

Since a part of the wiring strip is not exposed in the positioning hole, the waterproof ability is enhanced.

Further, since the inner base made of the insulation resin is insert molded in the thickness of the stationary contact base (also made of insulation resin) and even if there is a difference of thermal shrinkage rate between both members, a slit will not form and the waterproof ability is improved.

In the process for manufacturing the stationary contact base, before the wiring strips are placed in one side of two molding dies for molding the inner base, the wiring strips are fixed by being depressed on a surface of one side of the die and by a convex projection installed on another die which closes on the other die. The stationary contacts are formed at a point when the wiring strip fixing convex projection and a concave groove of one side of the die close upon each other. The stationary contacts project into the concave groove formed on a surface of one side of the die by the force of the wiring strip fixing convex projection utilizing die closing pressure. The inner base is formed by exposing the stationary contacts on a surface and pouring the insulation resin in the molding die cavity and then the inner base is removed to another die prepared for the stationary contact base and is insert molded while exposing the stationary contact on a surface thereof.

Since formation of the stationary contacts is achieved by the die closing pressure in the molding of the inner base, the number of steps in the manufacturing process may be reduced compared to the prior art methods where the wiring strips are formed by press forming.

In addition, it is not necessary to require machining on the contact surface due to poor molding where the inner insulation resin is covered and the contact surface height is not flat. Such machining processes damage the surface of the stationary contacts.

In an other embodiment in manufacturing the stationary contact base of the switch device, wiring strips are insert molded in insulation resin and the stationary contact base having stationary contacts are formed by deforming to project a part of the wiring strip. The wiring strips are placed on one side of a divided molding die for molding the stationary contact base. The wiring strips are formed by a fixing convex projection installed on another die which closes on the other die. The stationary contacts are made by being deformed to project part of the wiring strips into a concave groove formed on a surface of one side of a die facing the wiring strip fixing convex projection by die closing pressure. The wiring strips can be insert molded by pouring insulation resin into a molding die cavity where the convex projection is moved upward in a retreating position, exposing the stationary contacts on a surface thereof.

Since formation of the stationary contacts is achieved by the die closing pressure molding of the stationary contact base, like the inner base, the number of steps in the manufacturing process can be reduced compared with the prior art methods where the wiring strip is formed by press forming.

In addition, it is not necessary to require machining on the contact surface due to poor molding where the inner insulation resin is covered and the contact surface height is not flat. Such machining processes damage the surface of the stationary contacts.

DETAILED DESCRIPTION OF THE PREFERRED EMBODIMENT

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
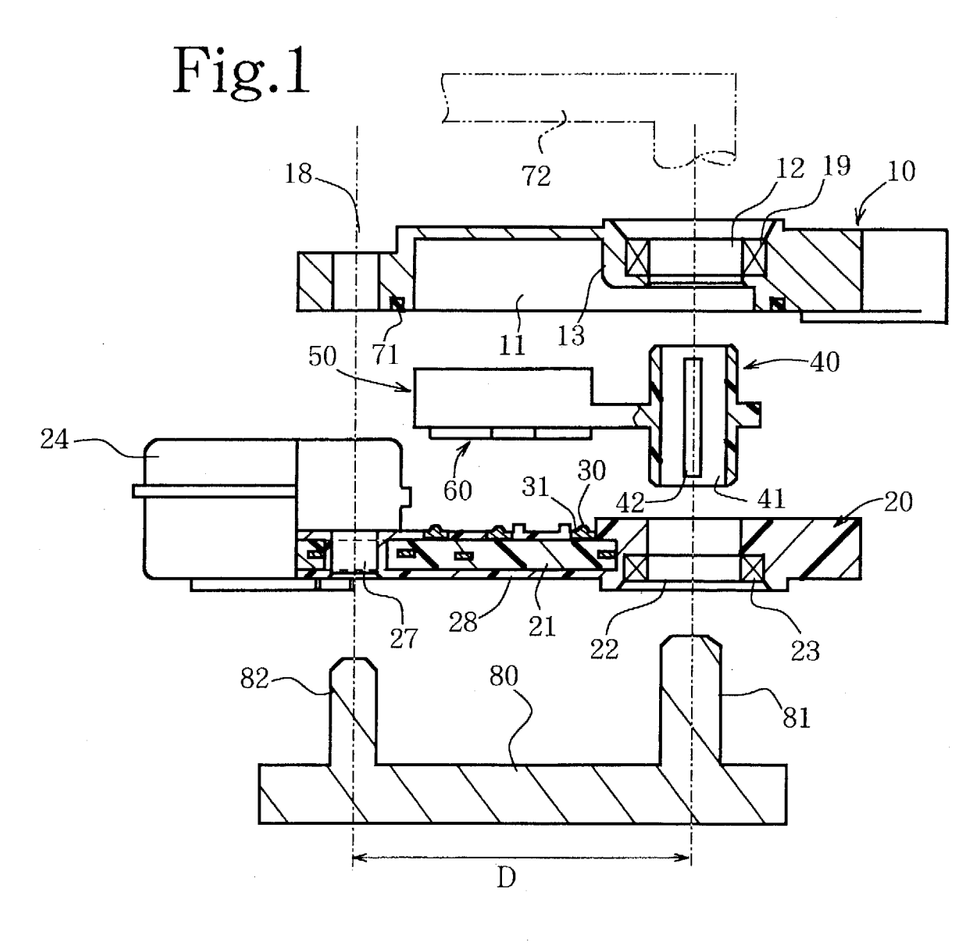
FIG. 1 is a dissolved sectional view explaining an assembling method of a shift position switch.
Figure 2:
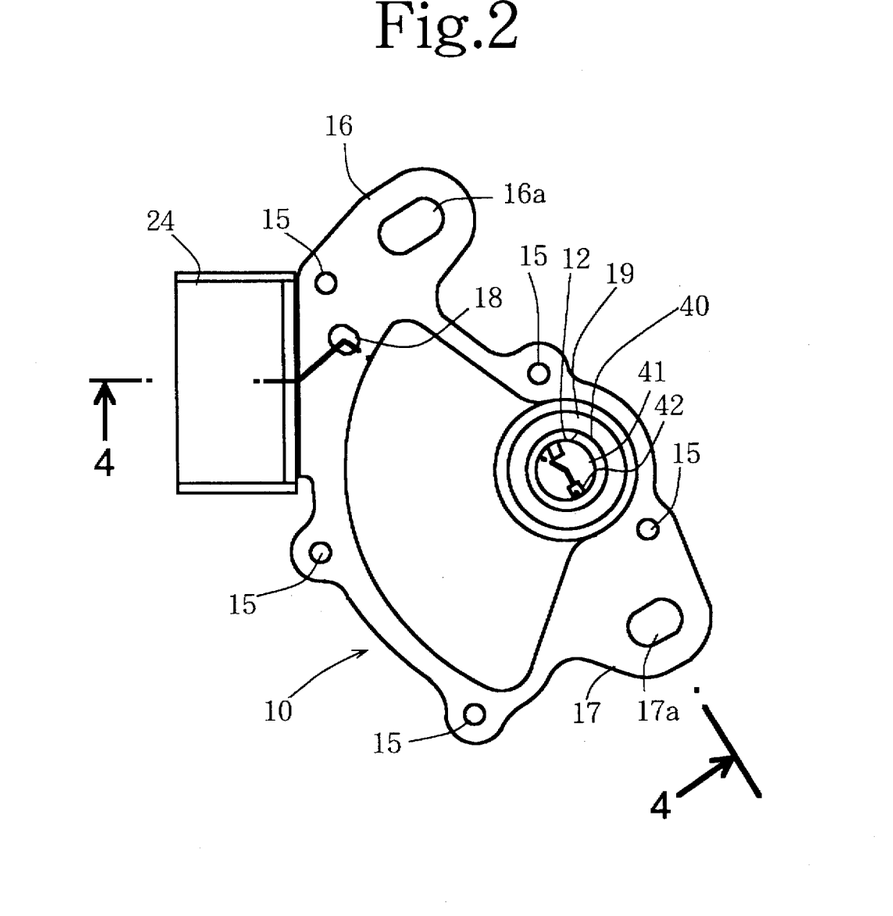
FIG. 2 is a plan view seeing from a case side of the shift position switch.
Figure 3:
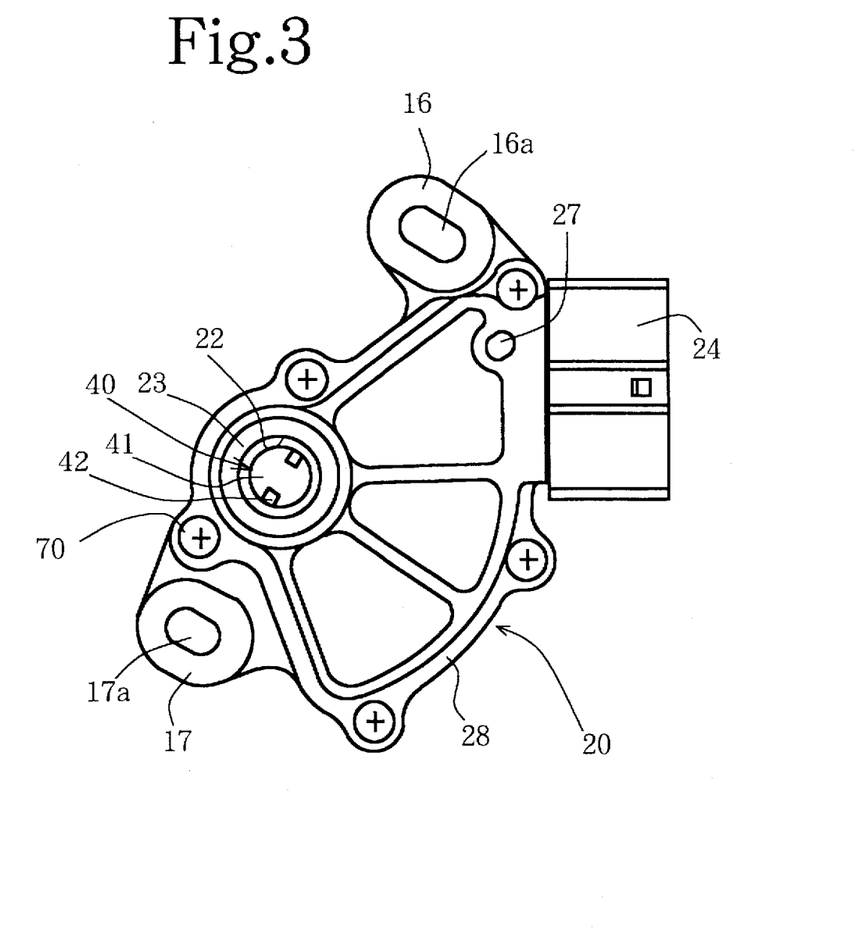
FIG. 3 is a bottom plan view thereof.
Figure 4:
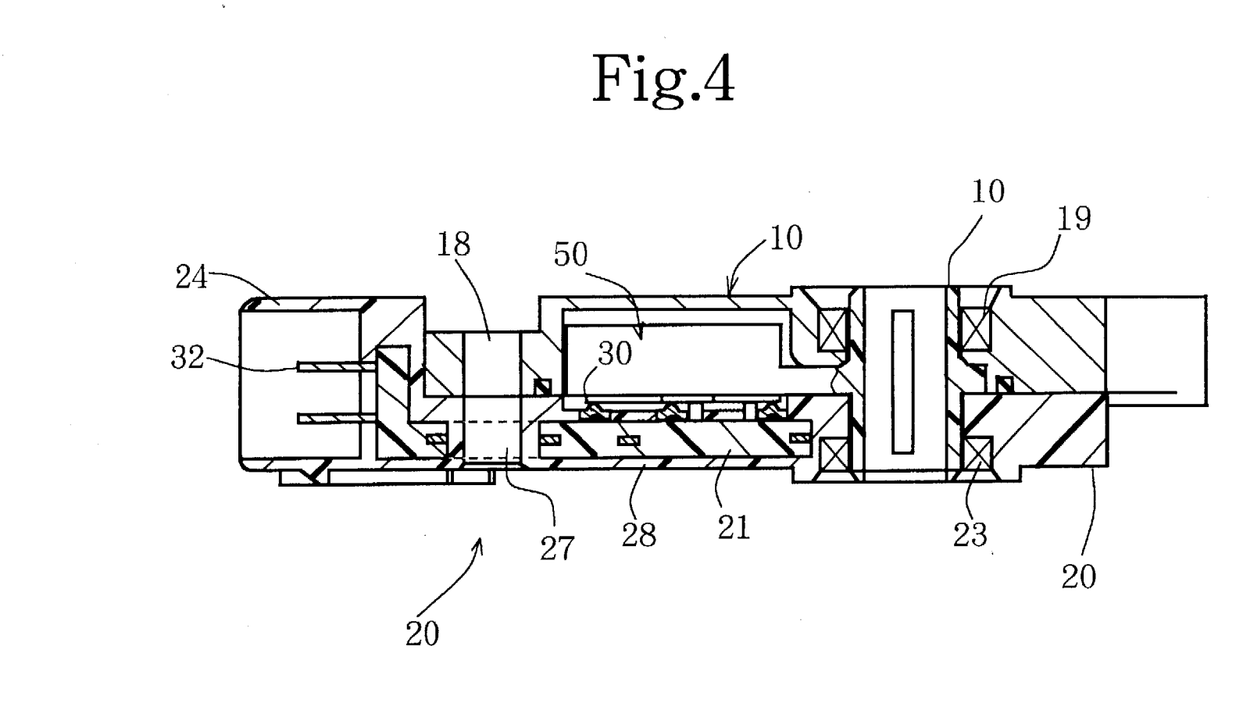
FIG. 4 is a sectional view taking along 4—4 line of FIG. 2.
Figures 5A, 5B:
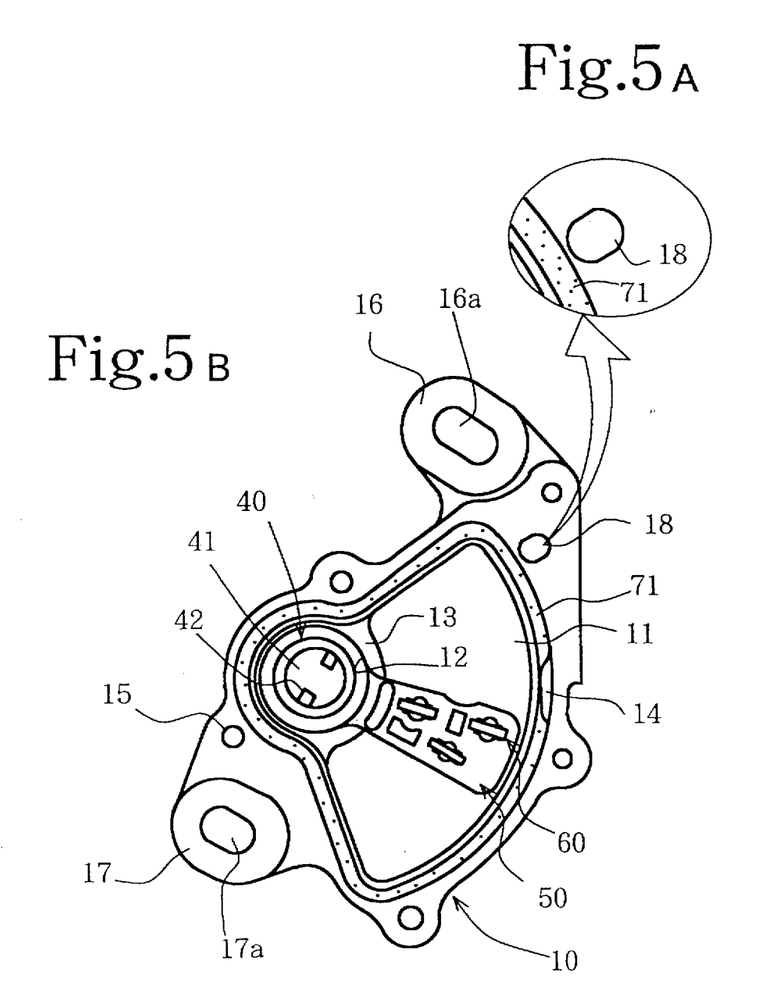
FIG. 5 is a view of eliminating a stationary contact base from FIG. 3.
Figure 6A:
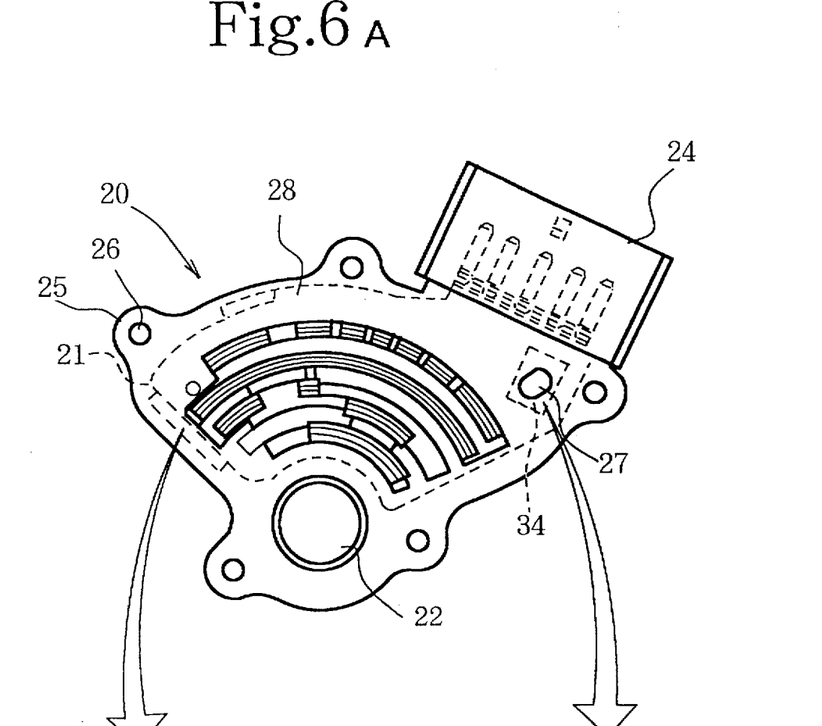
FIG. 6 is a plan view showing the stationary contact side of the stationary contact base.
Figure 6B:
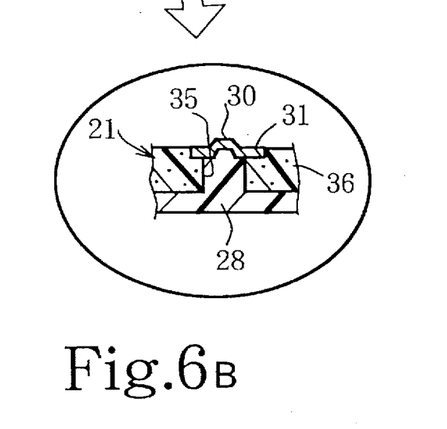
Figure 6C:
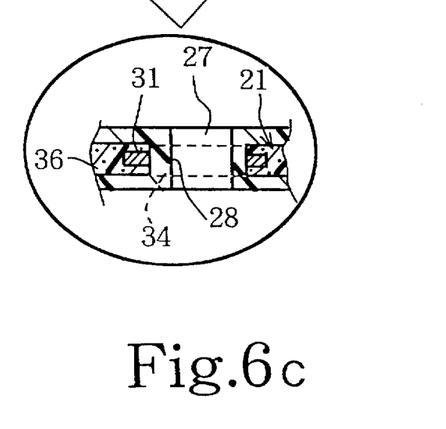
Figure 7:
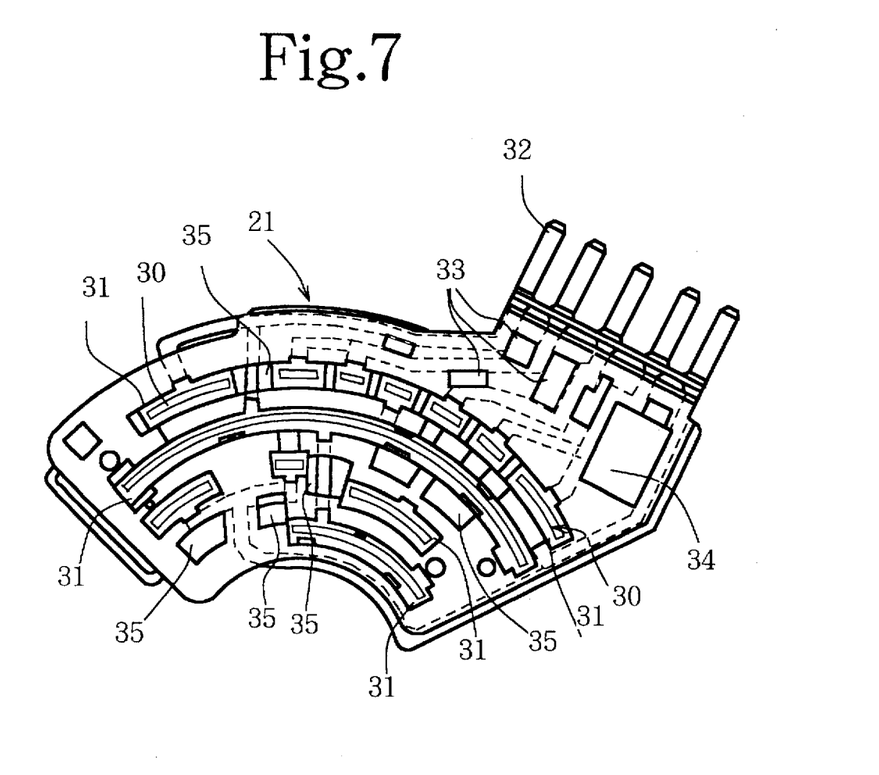
FIG. 7 is a plan view showing the stationary contact side of an inner base.
Figure 8:
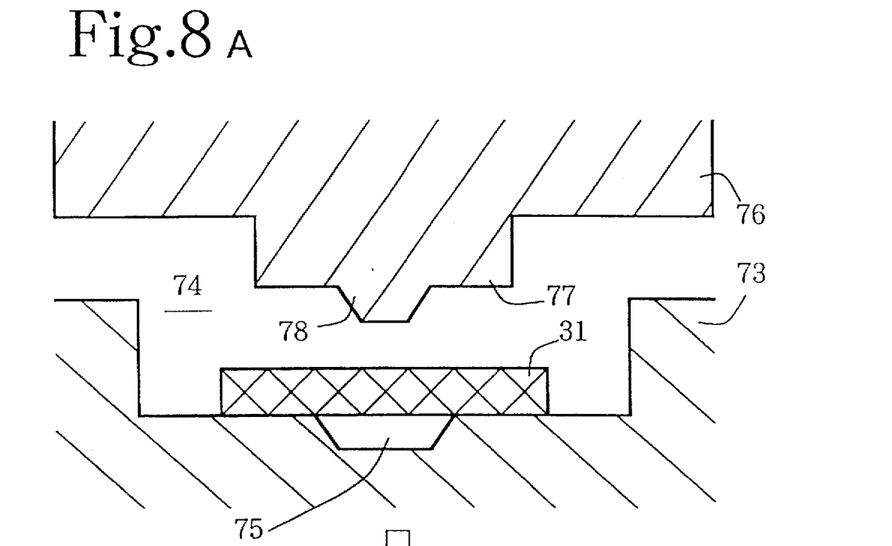
FIGS. 8(A) to 8(C) are schematic explanatory sectional views of the inner base molding.
Figure 9:
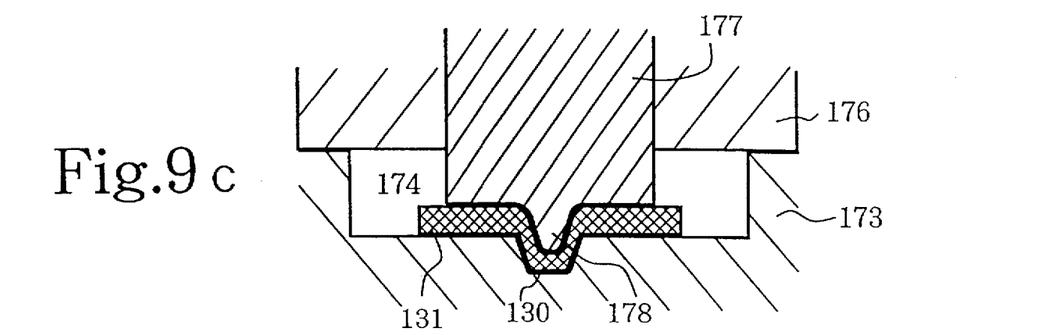
FIGS. 9(A) to 9(D) are schematic sectional views of a second embodiment.

One embodiment constructed for a shift position switch will be described with reference to the accompanying drawings. FIG. 1 is a view explaining an assembling method of a shift position switch. FIG. 2 is a plan view of the switch. FIG. 3 is a bottom view thereof. FIG. 4 is a sectional view taking along 4—4 line of FIG. 2. FIG. 5 is a view of eliminating a stationary contact base from FIG. 3. FIG. 6 is a plan view of the stationary contact base. FIG. 7 is a plan view of a inner base. FIG. 8 is a schematically explanatory sectional view of the inner base molding and FIG. 9 is a schematically sectional view of a second embodiment.

In FIG. 1 through 8, a shift position switch comprises: a switch case 10 approximately shaped as an unfolded fan; a stationary contact base 20 approximately shaped in an unfolded fan overlaid thereon; stationary contacts 30 exposed on a rear side thereof; a shaft holder 40 supported by both of the switch case 10 and the stationary contact base 20 (the shaft holder 40 being a shaft member in the present invention); a movable contact holder 50 fixed at one end thereof; and a movable contacts 60 disposed on the surface thereof.

The periphery of the switch case 10 and the stationary contact base 20 are joined to each other by some screws 70 at a proper span. (see FIG. 3).

As apparent in FIG. 5, a concave body 11 shaped as an approximately unfolded fan is formed deeply as one step to accommodate the movable contact holder 50 in the switch case 10 and a step portion 13 having a shaft hole 12 is formed on a pivot position of the fan.

A packing groove 14 is formed on the periphery of the concave body 11 and a packing 71 is accommodated herein, in addition, some female screw holes 15 are made at proper span on an outer periphery of the packing groove 14.

In addition, car body side mounting portions 16, 17 are disposed at about symmetrical positions on the either side of the shaft hole 12 to project outward. Two longer holes 16a and 17a are made for mounting at each position thereof, and a positioning hole 18 is made in the vicinity of the concave body 11 of the car body side mounting portion 16.

Herein, the positioning hole 18 is shaped as a long hole and a longitudinal direction thereof is agreed with a radial direction of the shaft hole 12.

An oil seal 19 is fitted in the shaft hole 12 of the step 13 from the outer side. (The side to be an appearance on assembling, the same as below.) (see FIG. 1).

The stationary contact base 20 is a member consisting of synthetic resin shaped in approximately an unfolded fan to fit in the concave body 11 of the switch case 10 and a inner base 21 is inserted in a thickness thereof.

A shaft hole 22 is formed at a portion corresponding to a pivot of the fan of the stationary contact base 20 and an oil seal 23 is fitted also herein from an outer side.

A coupler 24 is secured together on a peripheral portion of the stationary contact base 20. Some mounting bosses 25 are protruded outward and some through-holes 26 for passing screws are formed respectively therein.

A positioning hole 27 shaped in a long hole is formed in the vicinity of the coupler 24 and at a position corresponding to the positioning hole 18 of the switch case 10 in same shape thereof.

The inner base 21 is a member which is insert molded into an inner synthetic resin 36 in a condition that a plurality of wiring strips 31 are arranged beforehand in plural rows and plural columns, as showing the surface of the contact side in the FIG. 7. Hereupon the stationary contact base 20 is integrated with the coupler 24 and others by insert molding using the inner base 21.

A part of the wiring strip 31 is protruded in an embossed shape and becomes the stationary contact 30 exposed on the inner base 21 and finally on the contact side surface of the stationary contact base 20.

One end of each wiring strip 31 is caused to be a contact terminal 32 projecting into a portion corresponding to outer coupler, several punched holes 33 are made at suitable place thereof and then the portions not to be continued are cut out therefrom.

Particularly, among the punched holes a portion corresponding to a positioning hole 27 provides a window hole 34 and is formed as a larger hole than the positioning hole 27. In this case, some fixing walls 35 in the molding are formed on the wiring strip 31 at the suitable portion of the upper and lower surfaces of the inner base 21. (see FIG. 6 and 7)

FIG. 8 is a schematically explanatory view showing a molding method of the inner base 21. At first, the wiring strips 31 are embedded in a molding cavity 74 of a lower die 73 in 8(A) showing a state before pouring the inner insulation resin 36.

At this time, the wiring strips 31 do not have a projection as the stationary contacts 30 to be formed thereon and are flat. But concave grooves 75 are formed on a portion of the lower die 73 to set a wiring strip 31.

Meanwhile, fixing portions 77 are formed to face the wiring strips 31 on a upper die 76 and projections 78 for molding the stationary contacts are formed to correspond to the concave grooves 75.

Then, when the upper die 76 is closed, as shown in 8(B) the wiring strips 31 are fixed by the fixing portions 77 on the die face and a part thereof is pushed out into the concave grooves 75 by the projection 78, and the stationary contacts 30 are formed.

In this condition, if the inner insulation resin 36 is poured into the molding cavity 74, the inner base 21 is integrated with the wiring strips 31 and forms the stationary contacts 30. After being taken off from the die, the inner base 21 is machined to form either the punched holes 33, or the window hole 34.

The inner base 21 obtained as above mentioned is removed from the molding die and placed into another die prepared for the stationary contact base 20, where the inner base 21 is insert molded to cover the whole circumference by a stationary contact base insulation resin 28 leaving only the stationary contact 30 exposed and the stationary contact base 20 is formed thereby.

As apparent from a sectional structure shown schematically in the exploded view of FIG. 6, since the window hole 34 is formed a little larger than the positioning hole 27, the stationary contact base insulation resin 28 enters into an inner side thereof and then the wiring strips 31 exposed by forming of the window hole 34 are also covered and completely insulated.

Besides, since the fixing walls 35, formed by the fixing portions 77 when the inner base 21 is molded, are covered by the stationary contact base insulation resin 28, the wiring strips 31 exposed on this side are also covered completely and insulated.

The shaft holder 40 is sustained as rotating freely by the switch case 10 and the stationary contact base 20 through one end thereof being fitted to the shaft hole 12 and another end thereof being fitted to the shaft hole 22.

A shaft hole 41 is formed in the shaft holder 40 to pass through the shaft portion of a lever 72 (see FIG. 1) and a positioning rib 42 is formed on an inner surface in a longitudinal direction.

As apparent from the FIG. 1, 4, and 5, the movable contact holder 50 is an arm type member integrated with the shaft holder 40 and rotates around the shaft holder 40 as a center in the concave body 11.

The movable contacts 60 are inserted into a side facing the stationary contacts 30 of the movable contact holder 50 and energized by a springs toward a projecting direction to contact with the stationary contacts 30 at a specified contact pressure.

Next, an operation of the present embodiment is explained. First, in assembling of the switch, as shown in FIG. 1, the switch case 10, the shaft holder 40 and the stationary contact base 20 are assembled on a jig 80.

In this case, the shaft hole 12 of switch case 10, the shaft hole 41 of the shaft holder 40 and the shaft hole 22 of the stationary contact base 20 are fitted on a rod 81 for shaft assembling secured projecting at one end of the jig 80.

At the same time, each positioning hole 18 and 27 of the switch case 10 and the stationary contact base 20 are fitted to a positioning rod 82 secured at another end of the jig 80.

Next, three members comprising the switch case 10, the shaft holder 40 and the stationary contact base 20 are assembled to compose one body by fastening a screw 70 from the through-hole 26 side so that the female screw hole 15 of switch case 10 fit with the through-hole 26 of the stationary contact base 20.

By assembling the three members and because a distance D (see FIG. 1) between each rod 81 and 82 is constant, the switch case 10 and the stationary contact base 20 are positioned accurately in the rotating direction of the movable contact holder 50 which is an important dimension in the assembly.

At the same time, the movable contact holder 50 can be positioned as being centered accurately by the rod 81, while dimensional error in the radial direction of rotation is absorbed by both the positioning holes 18 and 27 being made as long holes to the radial direction of rotation of the movable contact holder 50.

Hereupon, the stationary contact base 20 and switch case 10 are screwed by the screw 70 to secure these three members.

As a result of securing the three members and even though the shaft holder 40 being fixed at both ends to the switch case 10 and the stationary contact base 20 (which are separate members relatively movable to each other), the shaft holder 40 can be centered accurately to prevent a wobble in the circumference direction.

Since the shaft holder 40 passes through the switch case 10 and the stationary contact base 20 and the positioning holes 18 and 27 also pass through each other, assembling of the lever 72 is possible either on the switch case 10 or on the stationary contact case 20, and assembling to the jig 80 is possible either from the switch case 10 or from the stationary contact base 20.

Furthermore, since forming of the stationary contact 30 is completed by the die fixing pressure at molding of the stationary contact base 20, the number of steps in the manufacturing process can be reduced compared with the former method where the wiring strips 31 are formed by punching.

In addition, since the wiring strips 31 provide the protruding stationary contacts 30 therefrom and since they are formed by insert molding by pouring the inner insulation resin 36 into the periphery of the wiring strip 31 leaving the wiring strips 31 fixed by the fixing portions 77, (the fixing portion are a part of molding die 76), it is not necessary to require machining on the contact surface. Machining, typically causes the surfaces of the stationary contacts 30 to be damaged.

Since the inner base 21 is insert molded in the thickness of the stationary contact base 20, even if there is a difference of thermal shrinkage rate between both members, a waterproof ability is improved because a slit is not formed.

Furthermore, since a part of the wiring strips 31 is not exposed in the positioning hole 27 where the window hole 34 is larger than the positioning hole 27 in the inner base 21 and is covered on the inside thereof by the stationary contact base insulation resin 28, the water proof ability is further improved.

The method of molding the stationary contacts all at once by die closing pressure may be applied to a method of molding the stationary contacts directly without using the inner base.

FIG. 9 shows a second embodiment of such an example in a schematically sectional view similar to FIG. 8. In drawing 9(A) before the inner insulation resin is poured in, wiring strips 131 are placed in a molding cavity 174 of a lower die 173.

At this time, the projections for stationary contacts 130 are not formed yet on wiring strips 131 which have a flat shape. However, concave grooves 175 are formed on the portion of the lower die on which the wiring strips are embedded.

Movable portions 177 functioning as fixing portions when the dies tighten, face the wiring strips 131 and are formed on a upper die 176. Projections 178 for forming stationary contacts with the concave grooves 175 are formed on the tips thereof.

The movable portions 177 can move between an embossing position 9(A,B) projecting downward in the drawing from the die face of the upper die 176 when the die closes and a retreating position 9(C) being about the same surface level as the die surface of the upper die 176 leaving the tip projection 178 after the die closed.

When the upper die 176 is closed in the state where the movable portions 177 are in the embossing position, as shown in 9(B), the movable portions 177 function as fixing portions of the wiring strips 131 through fixing the wiring strips 131 on the die face of the lower die 173 by the die closing pressure of the upper die 176, while stationary contacts 130 are formed by the projections 178 pushing out part of the wiring strips 131 toward the concave grooves 175.

As shown in 9(C), only the movable portions 177 are moved upward to the retreating position. In this condition, a stationary contact base insulation resin is poured into the molding cavity 174. The stationary contact base through molding integrates with the wiring strips 131 formed on the stationary contacts 130.

Because the stationary contacts 130 portions of the wiring strips 131 are fixed in the concave grooves 175, and when the stationary contact base insulation resin 136 is poured, the wiring strips 131 are insert molded in the state of being fixed, sticking on the die surface.

By using such a method, the stationary contact base can be molded directly and therefore, eliminates the inner base, where the stationary contacts 130 can be formed all at once by the die closing pressure at molding of the stationary contact base.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A switch device comprising:

a switch case having a substantially unfolded fan-shaped concave body;

a movable contact holder being partially disposed in said concave body for free rotation;

said movable contact holder including a shaft member for providing a rotary center at one end thereof;

a stationary contact base being mounted on said switch case for covering said concave body and disposing said movable contact holder therein;

stationary contacts being supported on a surface of said stationary contact base and slidingly contacting movable contacts projecting from one side of said movable contact holder, each stationary contact including a convex portion spaced apart and protruding from said stationary contact base and a concave portion disposed on an opposite side of said convex portion, said contact base includes a resin material which fills each convex portion of each stationary contact;

a shaft hole being formed in a part of said switch case to form a pivot portion for said concave body;

a shaft hole being formed in said stationary contact base and aligned with said pivot portion;

said shaft member having end portions formed on said movable contact holder and being rotatively fitted in said shaft holes, respectively;

a through-hole for a lever mounting being formed in said shaft member of said movable contact holder; and positioning holes passing through corresponding portions of said switch case and said stationary contact base, respectively, whereby said stationary contacts with said convex portions substantially alleviate machining of said contact surfaces while manufacturing steps of said switch device are substantially reduced.

2. The switch device in accordance with claim 1, wherein one of said shaft holes and one of said positioning holes of said switch case are formed on an outside region of said concave portion of said switch case, respectively.

3. The switch device in accordance with claim 2, wherein said positioning holes are long holes lengthened in a radial direction of said movable contact holder to absorb dimensional errors.

4. A process for manufacturing a stationary contact base used for a switch device comprising:

a switch case having a substantially unfolded fan shaped concave body;

a movable contact holder being partially disposed in said concave body for free rotation;

said movable contact holder including a shaft member for providing a rotary center at one end thereof;

a stationary contact base being mounted on said switch case for covering said concave body and disposing said movable contact holder therein;

stationary contacts being supported on a surface of said stationary contact base and slidingly contacting movable contacts projecting from one side of said movable contact holder, wherein said process comprises the steps of:

(a) inserting and molding a wiring strip having stationary contacts in an inner base;

(b) forming a window hole larger than a positioning hole of said stationary contact base at a position corresponding to said positioning hole;

(c) insert molding said inner base in a thickness dimension of said stationary contact base by embedding said inner base in a molding die of said stationary contact base and pouring insulation resin hereunto;

(d) covering an inner side of said window hole of said inner base with said insulation resin; and (e) forming said positioning hole by passing through a smaller through hole than said window hole on an insulation layer formed inside of said window hole.

5. The process for manufacturing a stationary contact base used for a switch device in accordance with claim 4, wherein said process comprises the steps of:

(a1) before the inserting and molding said wiring strip having stationary contacts in said inner base step (a), placing said wiring strips on one side of two molding dies;

(a2) fixing and depressing said wiring strips on a surface of one side of a first die by a convex projection installed on a second die which closes on said first die;

(a3) forming said stationary contacts by closing said convex projection of said second die on a concave groove of said first die, whereby said stationary contacts project into said concave groove of said first die;

(a4) forming said inner base by exposing said stationary contacts and pouring said insulation resin into a molding die cavity comprising said first and second dies;

(a5) removing said inner base to another die prepared for said stationary contact base; and (a6) insert molding said inner base while exposing said stationary contacts on a surface thereof.

6. A process for manufacturing a stationary contact base used for a switch device comprising:

a switch case having a substantially unfolded fan shaped concave body;

a movable contact holder being partially disposed in said concave body for free rotation;

said movable contact holder including a shaft member for providing a rotary center at one end thereof;

a stationary contact base being mounted on said switch case for covering said concave body and disposing said movable contact holder therein;

stationary contacts being supported on a surface of said stationary contact base and slidingly contacting movable contacts projecting from one side of said movable contact holder, wherein said process comprises the steps of:

(a1) placing said wiring strips on one side of two molding dies;

(a2) fixing and depressing said wiring strips on a surface of one side of a first die by a convex projection installed on a second die which closes on said first die;

(a3) forming said stationary contacts by closing said convex projection of said second die on a concave groove of said first die, whereby said stationary contacts project into said concave groove on of said first die; and (a4) pouring insulation resin into a molding die cavity comprising said first and second dies; said insulation covering said wiring strips when said convex projection is moved upward in a retreating position, exposing said stationary contacts on a surface thereof.

* * * * *